United States Patent [19]

Etter et al.

[11] 4,308,302
[45] Dec. 29, 1981

[54] WEATHERSTRIP AND COMPOSITION OF MATTER THEREFOR

[75] Inventors: Gordon E. Etter, St. Mary's; William Hoverman, Jr., Wapakoneta, both of Ohio

[73] Assignee: The Goodyear Tire & Rubber Company, Akron, Ohio

[21] Appl. No.: 238,863

[22] Filed: Feb. 27, 1981

[51] Int. Cl.³ .................... E06B 7/18; E04F 19/02; B32B 3/02
[52] U.S. Cl. ........................... 428/83; 49/490; 49/496; 49/498; 428/101; 428/122; 428/164; 428/188; 428/192; 521/142; 521/150
[58] Field of Search ............... 49/490, 496, 497, 498; 428/122, 164, 188, 192, 217, 358, 83, 99, 100, 101, 310, 315; 521/137, 142, 150

[56] References Cited

U.S. PATENT DOCUMENTS

| | | | |
|---|---|---|---|
| 3,958,369 | 5/1976 | Mathellier | 49/498 |
| 4,042,741 | 8/1977 | Bright | 428/122 |
| 4,232,081 | 11/1980 | Pullan | 428/217 |

FOREIGN PATENT DOCUMENTS

| | | | |
|---|---|---|---|
| 2238366 | 3/1974 | Fed. Rep. of Germany | 521/150 |
| 774351 | 5/1957 | United Kingdom | 521/150 |

Primary Examiner—William J. Van Balen
Attorney, Agent, or Firm—D. M. Ronyak

[57] ABSTRACT

A flange mountable weatherstrip includes a coated flange cover and a hollow sealing member. The coating and the sealing member are preferably formed in a single extrusion operation of a single low durometer elastomeric sponge material. The preferred physical properties of the elastomeric material and its formulation are described. The flange cover is adaptable to frictionally engage a supporting edge flange. The sealing member is of an asymmetric cross-sectional configuration resembling an upper case letter D.

12 Claims, 1 Drawing Figure

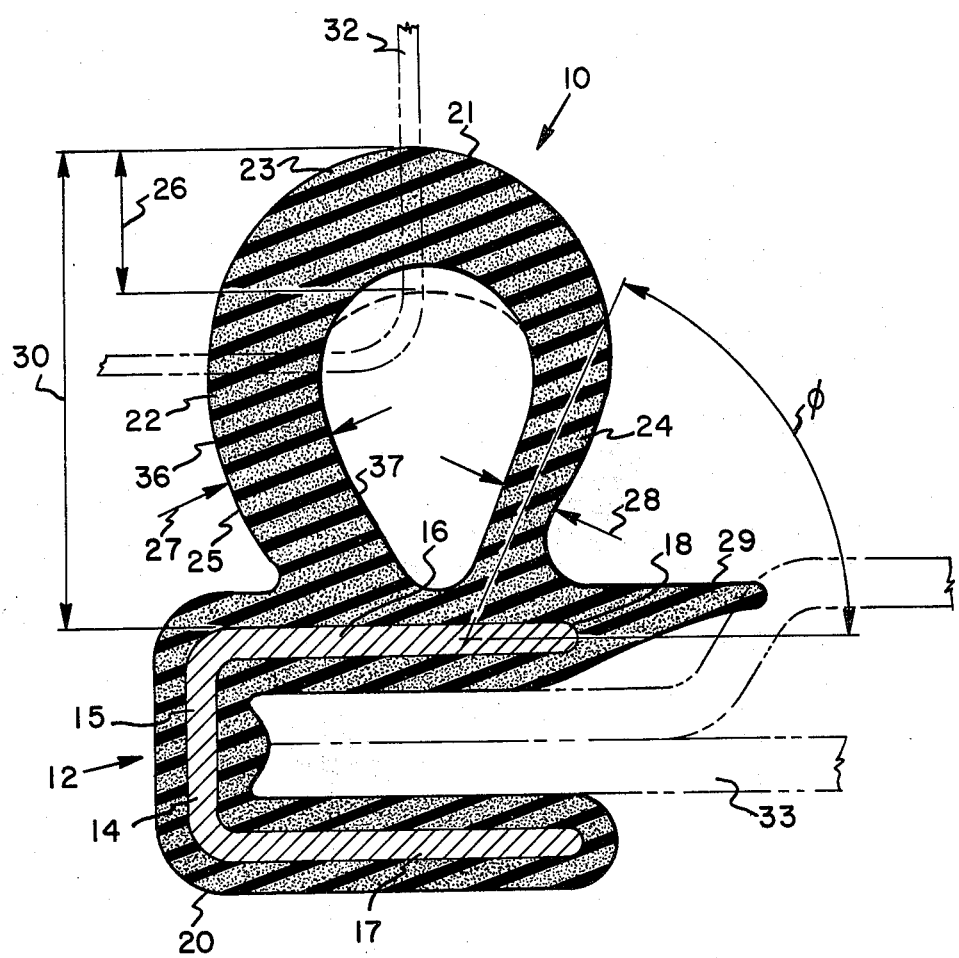

WEATHERSTRIP AND COMPOSITION OF MATTER THEREFOR

The abstract is not to be taken as limiting the invention of this application and in order to understand the full nature and extent of the technical disclosure of this application, reference must be made to the accompanying drawings and the following detailed description.

The present invention relates to flange mountable seals or weatherstrips such as for sealing around door or window openings and the like, for example, for employment in vehicle body construction.

Flange mountable weatherstrips embodying the invention will now be described by way of example only with reference to the accompanying drawing in which there is illustrated a fragmentary cross-sectional view of an automobile closure structure embodying a flange mountable weatherstrip according to the invention, the dashed line indicating another preferred embodiment.

Flange mountable weatherstrips are mounted on a flange surrounding a door opening such as a door opening in a vehicle body, the flange entering the U-shaped channel through its open mouth and being gripped by the sides of the channel or by gripping ribs therein. The strip protects and decorates the flange and carries a soft sealing section providing weatherproofing upon closure.

Referring to the FIGURE, there is illustrated a flange mountable weatherstrip 10 including a flange cover 12 having a hollow sealing member 21 joined thereto. The weatherstrip 10 is shown mounted on a body flange 33 to seal a door edge 32 relative to the body flange 33.

The flange cover 12 is adaptable to frictionally engage a supporting edge flange 33 such as may occur in a door or trunk opening, for example, of an automobile. The flange cover 12 is an elongated strip. The flange cover 12 is supported by a carrier 14 capable of being formed into a U-shaped cross-sectional configuration defined by a central web 15 and first and second leg portions 16 and 17, respectively. For ease of manufacture the carrier is typically received as a flat ribbon on a roll or reel and is formed into a U-shaped cross-sectional configuration before or after extrusion of the sealing member 21 thereon. In preferred embodiments, the carrier 14 includes a coating of elastomeric material 20. The elastomeric material used to coat the carrier 14 is preferably of the same formulation as that of the sealing member 21 and integrally formed therewith by a single extrusion operation. A suitable carrier is obtainable from Schlegel Corporation, Rochester, New York, and is known as wire carrier.

The sealing member 21 is cantilevered from the flange cover 12. The sealing member 21 is of an asymmetric cross-sectional configuration resembling an upper case letter D. The sealing member 21 includes a generally C-shaped portion 22 extending from the outer surface of the first leg portion 16 of the flange cover 12 adjacent to the web portion 15 thereof. The convex side 25 of the C-shaped portion 22 is presented toward the web portion 15. The sealing member 21 also includes a straight portion 24 which extends from the outer surface of the first leg portion 16. The C-shaped portion 22 and the straight portion 24 are joined to one another at their ends distal the first leg portion 16.

The straight portion 24 extends from the outer surface of the first leg portion 16 such that it forms an acute angle $\phi$ with the plane of the carrier 14 in the first leg portion 16 when this plane is extended outwardly from the adjacent end 18 of the carrier 14.

The straight portion 24, in preferred embodiments, as it extends from the outer surface of the first leg portion 16 increases approximately linearly in thickness and is of a thickness equal to that of the C-shaped portion 22 where they join distal the first leg portion 16 of the flange cover 12. The minimum thickness of the straight portion 24 is preferably less than that of any part of the C-shaped portion 22. More preferably, the straight portion 24 at its point of minimum thickness 28 is about one-half of the thickness of C-shaped portion 22 at its point of minimum thickness 27.

Thickness of the sealing member 21 or any part thereof is determined by finding the least dimension between any chosen point on the outside surface 36 of the sealing member and the interior surface 37 of the sealing member. This can be accomplished by placing a compass on the point of interest of the outside surface and adjusting the compass so as to just reach to a point on the interior surface when swung in an arc.

The sealing member 21 preferably includes an additional sealing rib 29 which extends from the end of the first leg portion 16 of the flange cover 12 distal the web portion 15 of the flange cover and tapers in thickness from its junction with the flange cover towards its tip. As illustrated in the drawing, this additional rib 29 is intended to sealingly engage a portion of the vehicle body adjacent the flange 33 of the vehicle body.

To prevent excessive distortion or collapse of the sealing member when formed of a low durometer elastomeric sponge material the thickness of a sealing member according to the invention is greater than that now commonly employed for flange mountable, hollow weatherstrips. This enables a weatherstrip according to the invention to accommodate very small radius of curvature of the flange upon which it is mounted without collapse of the sealing member or distortion sufficient to impair its sealing function. Thus, a weatherstrip according to the invention substantially reduces or eliminates the need for molded corner pieces such as are now commonly employed in known flange mountable hollow weatherstrips. It is preferable that the wall thickness of the sealing member 21 be at least about 1.8 mm. (0.70 thousandths of an inch) and more preferably of a thickness from about 4.0 to 5.5 mm. (0.125 to 0.220 inch). The minimum thickness required to prevent excessive distortion is related to the radius of curvature to be accommodated with a decrease in radius of curvature requiring more resistance to collapse and, therefore, a thicker wall section when all other parameters of the sealing member are held constant.

As examples of weatherstrips according to the invention, when the overall height 30 of the sealing member 21 is about 16 mm. (⅝ of an inch) in its new, undeformed condition, the thickness of the C-shaped portion 22 should be from about 3 to 4.5 mm. (0.125 to 0.180 inch), the thickness of the straight portion 24 should be from about 1.8 to 3 mm. (0.70 to 0.125 inch), and the thickness 26 of the outermost part 23 of the C-shaped portion 22 should be from about 3.8 to 5.5 mm. (0.150 to 0.220 inch). The outermost part 23 of the C-shaped portion 22 may be of the same thickness as that of the remainder of the C-shaped portion.

"Overall height" 30 as used herein is the distance from the plane of the carrier 14 in the first leg portion 16 of the flange cover 12 measured perpendicularly to a parallel plane which is tangent to the outermost part 23 of the C-shaped portion 22 of the sealing member 21.

Referring to the FIGURE, there is illustrated by a dashed line an alternate embodiment sealing member whose outermost part 23 of the C-shaped portion 22 is of greater thickness than the remainder of the C-shaped portion 22 or the straight portion 24. This embodiment is particularly suitable for applications where the corners of the body flange 33 are of small radius, for example, approaching the overall height 30 of the sealing member, since thickening the outer part 23 of the C-shaped portion 22 provides improved resistance to buckling upon installation of the weatherstrip to a radiused flange. The thickness 26 of the outer part of the C-shaped portion preferably exceeds the minimum thickness of the remainder of the C-shaped portion 22 by one mm. (0.04 inch) and more preferably by about twenty percent.

The coating 20 on the flange cover 12 and the sealing member 21 are formed of a single low durometer elastomeric sponge material. The cured elastomeric sponge material when free blown has a durometer from about 40 to 60 Shore "00" scale. Increased durometer may result in an undesirable amount of force being required to effect closure of the automobile door or whatever to which the weatherstrip has been applied. Durometer values lower than 40 Shore "00" may result in insufficient sealing forces.

It is desirable to minimize the weight of the weatherstrip. Preferably, the elastomeric sponge material is provided with sufficient blowing agents to reduce the calculated density of the unblown compound by at least forty percent. In preferred embodiments utilizing the elastomeric sponge material to be further described herein, the cured sponge material when free blown has a density of from about 0.40 to 0.60 megagrams per cubic meter.

Other properties needed in weatherstrip applications are tear resistance, tensile strength, resilience, and compression set. It is desired that the elastomeric material of which the sealing member is to be formed exhibit the following physical properties when measured on the cured compound having no blowing agents added.

| Test Designation | ASTM | Value |
| --- | --- | --- |
| Bayshore resilience | D2632 @ 23° C. | 50% minimum |
| Tensile | D412 @ 23° C. | 1000 psi min. |
| Elongation at rupture | D412 @ 23° C. | 300% min. |
| Modulus @ 100% elongation | D412 @ 23° C. | 50–90 psi |
| Compression set | D395 22 hrs @ 70° C. | 25% max. |
| Tear resistance | D624 Die C | 55 lb/in min. |

On the cured elastomeric sponge material used for the sealing member of weatherstrips according to the invention, the following physical properties are preferred.

| Test Description | Temp | Value |
| --- | --- | --- |
| Shore durometer "00" scale | 23° C. | 40 to 60 |
| Density | 23° C. | 0.40 to 0.60 megagrams/cu.meter |
| Tensile strength of foamed product | 23° C. | 250 psi min. |
| Elongation at rupture of foamed product | 23° C. | 250% min. |
| Tear resistance ASTM D624 Die C @ 23° C. | 23° C. | 25 lbs/in.min. |
| Compression set 22 hrs @ 70° C. compress to 60% of original height, remove and cool 30 min. at 23° C. | | 25% max. |
| Water absorption ASTM D1056 (2" sample immersed in water under 25" vacuum for 3 min.plus 3 min.additional immersion at atmospheric pressure) | | 2% maximum by weight is most preferred; 5% max. by weight is acceptable |

The above given physical properties are believed to be very suitable in weatherstrips according to the invention. Of special interest are the low durometer values given. These are desirable in weatherstrips of the configuration shown and described herein to avoid excessive closure force, for example, of an automobile door, on which the weatherstrip is installed.

The above given physical properties are obtainable in an elastomeric sponge material of the following general formulation. All values are stated as parts by weight based on 100 parts by weight of rubber hydrocarbon elastomer.

| Parts by weight/ 100 weight parts of elastomer | Ingredient |
| --- | --- |
| 100 to 70 (100 to 80 pref.) | poly(1,3-cyclopentylene-vinylene) elastomer |
| 0 to 30 (0 to 20 pref) | polychloroprene elastomer |
| 40 to 100 | carbon black - medium reinforcing oil furnace such as ASTM N472, N550 N660 |
| 170 to 250 | naphthenic rubber process oil |
| 3 to 5 | zinc oxide |
| ½ to 2 | stearic acid |

Preferred polychloroprenes are those having a high Mooney viscosity, that is, an ML 1+2.5@212° F. (100° C.) of about 90 to 120. Use of these polychloroprenes improves the shape retention of the extruded sealing member during curing.

In addition to the above-listed ingredients, rubber antioxidants and antiozonants and waxes are added to promote retention of physical properties upon extended exposure to the environment. These are not discussed specifically as they and their use are well known to those skilled in the art of elastomer compounding.

Also in addition to the above-listed ingredients, are to be added sulfur or sulfur donor curatives, accelerators, and thermodegradable blowing agents. These may be selected from those well known to those skilled in the art of elastomer compounding. The curing and blowing systems must be individually tailored to the specific process employed in the manufacture of the weatherstrip since the rate of cure and the rate of gas generation by thermal degradation of the blowing agent or agents are highly interdependent and must be considered together to achieve the desired amount of density reduction and closed cell micro-cellular sponge structure. Therefore, a detailed discussion of them is beyond the scope of this invention.

Of the preferred carbon blacks listed above, N472 is most desirable when microwave curing is to be employed since its use increases reception of the microwave energy. When hot air curing is employed N550 or N660 are preferred due to their lower cost in comparison to N472.

The level of naphthenic rubber process oil is given as a preferred range. Increased level of naphthenic rubber process oil reduces the durometer of the cured sponge material and vice versa. Paraffinic and aromatic rubber process oils are not recommended.

While certain representative embodiments and details have been shown for the purpose of illustrating the invention, it will be apparent to those skilled in the art that various changes and modifications may be made therein without departing from the spirit or scope of the invention.

What is claimed is:

1. A flange mountable weatherstrip comprising:
   (a) a flange cover adaptable to frictionally engage a supporting edge flange, said cover comprising an elongated carrier capable of being formed into a U-shaped cross-sectional configuration defined by a central web portion and first and second spaced leg portions, said cover having a coating of elastomeric material;
   (b) a hollow sealing member joined to said flange cover and integral with said coating, said sealing member being cantilevered from said cover, said sealing member being of asymmetric cross-sectional configuration resembling an upper case letter D and including a generally C-shaped portion extending from the outer surface of the first leg portion of the flange cover adjacent the web portion thereof and presenting its convex side to the web portion and a straight portion extending from the outer surface of said first leg portion, said straight portion being joined at its end distal said one leg portion to said C-shaped portion, said straight portion forming an acute angle with the plane of the carrier in said one leg portion when said plane is extended outwardly from the adjacent end of said cover;
   (c) said sealing member and said coating being formed of a single low durometer elastomeric sponge material.

2. The weatherstrip of claim 1, wherein said straight portion of the sealing member is of less thickness than said C-shaped portion.

3. The weatherstrip of claim 1, wherein said sealing member in its new undeformed state extends outwardly from said carrier not more than 25.4 mm. (one inch) and the minimum thickness of said straight portion is about one-half the minimum thickness of said C-shaped portion.

4. The weatherstrip of claim 2, wherein the thickness of the outermost part of the C-shaped portion located most distant from said carrier is greater than that of the remainder of said sealing member.

5. The weatherstrip of claim 1, 2, 3, or 4, wherein said sealing member has a wall thickness from about 1.8 mm (0.070 inch) to about 5.5 mm. (0.220 inch).

6. The weatherstrip of claim 5, wherein the cured elastomeric sponge material when free blown has a durometer from about 40 to 60 Shore "00" and a density from about 0.40 to 0.60 megagrams per cubic meter.

7. The weatherstrip of claim 6, wherein the cured elastomeric sponge material, when measured on the sealing member, has a tensile strength of at least about 17.6 kg. per square centimeter (250 pounds per square inch), an elongation at rupture of at least 250 percent, and does not absorb more than 5 weight percent of water when tested according to ASTM D1056.

8. The weatherstrip of claim 7, wherein the elastomeric sponge material comprises from about 100 to 80 parts of poly(1,3-cyclopentylenevinylene) elastomer and 0 to 20 parts of high Mooney viscosity chloroprene elastomer, from about 40 to 100 parts per one hundred parts of elastomer of carbon black, a sulfur donor and a blowing agent in amounts sufficient to produce a vulcanized closed cell sponge material.

9. A closed cell sponge material comprising:
   from about 100 to 70 parts by weight of poly(1,3-cyclopentylenevinylene) elastomer and 0 to 30 parts by weight of polychloroprene elastomer, and per each hundred weight parts of total elastomer, from about 40 to 100 parts of carbon black, a sulfur bearing reagent in an amount sufficient to crosslink the elastomer and a thermodegradable blowing agent in an amount sufficient to reduce the calculated density of the compounded material during vulcanization.

10. The sponge material of claim 9, further comprising per each hundred parts by weight of total elastomer from about 170 to 250 parts by weight of naphthenic rubber process oil.

11. The sponge material of claim 9 or 10, further comprising not more than 20 parts by weight of high Mooney viscosity polychloroprene and per each one hundred parts by weight of total elastomer from about 3 to 5 parts by weight of zinc oxide and from about one-half to two parts by weight of stearic acid, said carbon black being a medium reinforcing oil furnace carbon black.

12. The sponge material of claim 11, wherein calculated density of the compounded material is reduced by at least 40 percent upon vulcanization at atmospheric pressure.

* * * * *